United States Patent [19]

Pawloski et al.

[11] Patent Number: 4,864,049

[45] Date of Patent: Sep. 5, 1989

[54] (HALO)(HYDROXY)-SUBSTITUTED PHOSPHITES AND PHOSPHORATES

[75] Inventors: Chester E. Pawloski, Bay City; Sally P. Ginter, Sanford, both of Mich.

[73] Assignee: The Dow Chemical Company, Midland, Mich.

[21] Appl. No.: 170,477

[22] Filed: Mar. 21, 1988

Related U.S. Application Data

[60] Division of Ser. No. 927,996, Nov. 7, 1986, Pat. No. 4,754,048, which is a continuation-in-part of Ser. No. 695,519, Jan. 28, 1985, abandoned, which is a division of Ser. No. 388,786, Jun. 15, 1982, Pat. No. 4,496,494, which is a division of Ser. No. 250,449, Apr. 2, 1981, Pat. No. 4,365,026.

[51] Int. Cl.$^4$ .......................... C07F 9/14; C07F 9/146
[52] U.S. Cl. ......................................... 558/188; 558/91
[58] Field of Search ................................. 558/91, 188

[56] References Cited

U.S. PATENT DOCUMENTS

| | | | |
|---|---|---|---|
| 1,936,985 | 11/1933 | Lommel et al. | |
| 2,610,978 | 9/1952 | Lanham | 558/91 |
| 2,866,809 | 12/1958 | Kolka | 558/91 |
| 2,881,202 | 4/1959 | Pianfetti et al. | 558/91 |
| 2,938,877 | 5/1960 | Mack et al. | 558/91 |
| 2,974,159 | 3/1961 | Koral | 558/91 |
| 3,007,884 | 11/1961 | Kaplan et al. | 521/168 |
| 3,010,988 | 11/1961 | Raffelson et al. | 558/91 |
| 3,014,951 | 12/1961 | Birum | 558/91 |
| 3,132,169 | 5/1964 | Birum et al. | 260/977 |
| 3,192,242 | 6/1965 | Birum | 558/91 |
| 3,557,260 | 1/1971 | Gurgiolo | 260/977 |
| 3,758,646 | 9/1973 | Boyer | 521/168 |
| 3,939,227 | 2/1976 | Altscher et al. | 260/977 |
| 4,008,187 | 2/1977 | Turley | 521/168 |
| 4,086,194 | 4/1978 | Altscher et al. | 521/168 |
| 4,281,097 | 7/1981 | Albright | 521/168 |
| 4,298,709 | 11/1981 | Ginter et al. | 521/168 |
| 4,347,194 | 8/1982 | Ginter et al. | 558/158 |
| 4,510,101 | 4/1985 | Pawloski et al. | |

FOREIGN PATENT DOCUMENTS 1267259 3/1972 United Kingdom .

OTHER PUBLICATIONS

McOmie, "Protective Groups in Organic Chimistry", (1973), pp. 96–97.

Derwent Abstract 12814T, Chemiche Fabrik Kalk GmbH, Aug. 17, 1980.

*Primary Examiner*—Anton H. Sutto
*Attorney, Agent, or Firm*—Barbara J. Sutherland

[57] ABSTRACT

Novel (halo)(hydroxy)-substituted phosphorus-containing acid derivatives are disclosed. Preferred compounds are 2-halo-3-hydroxypropyl ester derivatives of phosphorus and phosphoric acid formed by reaction of at least some amount of tertiary butyl glycidyl ether with a halogenated derivative of a phosphorus-containing acid followed by acid dealkylation of the product. The polyol products are useful in the production of polyurethane articles such as foams having increased resistance to the effects of fire. The derivatives can be additives or reactants in the polyurethane, depending on the presence or absence of terminal hydroxyl groups within the given ester moieties.

3 Claims, No Drawings

(HALO)(HYDROXY)-SUBSTITUTED PHOSPHITES AND PHOSPHORATES

CROSS-REFERENCE TO RELATED APPLICATIONS

This is a divisional of application Ser. No. 927,996, filed Nov. 7, 1986 now U.S. Pat. No. 4,754,048 which is a continuation in part of application Ser. No. 695,519, filed Jan. 28, 1985 now abandoned, which is a divisional of application Ser. No. 388,786, filed June 15, 1982, U.S. Pat. No. 4,496,494, which is a divisional of application Ser. No. 250,449, filed Apr. 2, 1981, U.S. Pat. No. 4,365,026.

BACKGROUND OF THE INVENTION

The present invention relates to novel esters of phosphorous acid and phosphoric acid and to a novel method for their production. More particularly, the novel compounds are (halo)(hydroxy)-substituted phosphites and phosphorates and (halo)(hydroxyl)alkyl ester derivatives of phosphorus compounds. The compounds are particularly useful, respectively, as flame retardant additives and reactants in polyurethanes.

In U.S. Pat. No. 3,939,227, the reaction between a halide of an alkyl phosphonic acid and a hydroxy-terminated epoxy was reported. Specifically, the reference disclosed the reaction of glycidol with chloromethyl phosphonic dichloride. The reported product was a diol of the formula

where R was chloromethyl; X was chloro; and a was 1. The compound was found to be a highly viscous material. No further characterizing data was supplied.

The method illustrated by the above reference has proven difficult in practice due to the competing reactions between hydroxyl, instead of the suggested epoxy moieties, with the active phosphorus reactant sites resulting in impure product and high molecular weight oligomers as indicated by the viscous nature of the reported product. It is, for example, well-known that phosphonic chlorides react only with great difficulty with epoxy groups unless a catalyst is employed, cf. U.S. Pat. Nos. 1,936,985; 2,160,978; 3,010,980; etc. Accordingly in U.S. Pat. No. 3,939,227, low temperatures were employed along with slow addition of the phosphorus compound to a dilute solution of the epoxide in order to limit, if possible, competing reactions of the hydroxyl moiety. This process is not commercially acceptable and, as previously explained, was not entirely successful in U.S. Pat. No. 3,939,227 in preventing contaminating reaction products as indicated by the highly viscous nature of the reported product. The highly viscous reaction product is unsuitable in many applications requiring a polyhydroxyl-containing compound having low hydroxyl equivalent weight.

Furthermore, the reaction technique of U.S. Pat. No. 3,939,227 is not amenable for use with more reactive phosphorus compounds, such as $POCl_3$, $PCl_3$, or $PCl_5$. The competing reaction of hydroxyl moieties with these more reactive phosphorus compounds readily forms undesirable reaction products.

Accordingly, it is an object of the present invention to provide a process whereby highly pure (halo)(hydroxyl)alkyl phosphites and phosphorates may be prepared expeditiously and in high yield under commercially acceptable reaction conditions and times.

It is a further object of the present invention to produce highly pure (halo)(hydroxyl)alkyl ester derivatives of phosphorus compounds of low viscosity, which are suitable for use as intermediates in producing ignition resistant polyurethanes by reaction with a diisocyanate-containing compound. In this role the derivatives are therefore reactants in the polyurethane system. Preferably the (halo)(hydroxy)-substituted esters have a viscosity less than 500,000 centipoise at ambient temperatures in order that the compound be tractable and capable of use without employing a solvent.

Finally, it is an object of the present invention to produce highly pure (halo)(hydroxyl)alkyl ester derivatives of phosphorus compounds of low viscosity which are suitable for use as additives in polyurethanes. These additives impart ignition resistance.

These and other objects will be more fully illustrated with reference to the description of the preferred embodiments below.

Accordingly, the instant invention provides a substituted 2-halopropoxy phosphorus-containing compound selected from the group consisting of:

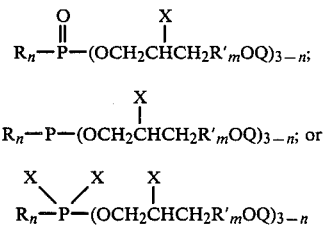

wherein:

X is halo-, preferably chloro- or bromo-:

R is hydroxy, halo, or a moiety having up to 10 carbons selected from alkyl, aryl, haloalkyl, haloaryl, alkoxy, alkoxyalkyl, aryloxyalkyl, haloalkoxy, and haloalkoxyalkyl;

R' is a divalent moiety having up to 10 carbons selected from alkylene, arylene, alkyl- and aryl-substituted derivatives thereof, and $(OCH_2CHR'')_x$ wherein R'' is hydrogen, methyl, ethyl or halomethyl, and x is 1, 2 or 3;

at least one Q is hydrogen and any remaining Q is independently hydrogen or a dealkylatable alkyl moiety;

m is zero or 1; and n is a number greater than or equal to zero and less than 3 that indicates the number of equivalents of specified moiety per mole of the named compounds;

the compound having a viscosity at 25° C. as measured by a Brookfield viscosity meter of less than 500,000 centipoise.

The instant invention also provides compounds of the above general formulas wherein Q is a dealkylatable alkyl moiety only.

The compounds are formed by reaction of an alkyl glycidyl ether capable of producing an ester reaction product which may subsequently be dealkylated to produce a hydroxyl moiety with at least one reactive phosphorus-containing compound of the formula:

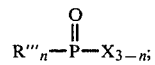

-continued $$R'''_n-P-X_{3-n}; \text{ or}$$

$$PX_5$$

wherein:

X and n are as previously defined; and

R''' is a moiety having up to 10 carbons selected from the group consisting of alkyl, aryl, haloalkyl, haloaryl, alkoxy, alkoxyalkyl, aryloxyalkyl, haloalkoxy and haloalkoxyalkyl.

Optionally, other epoxide-containing compounds may be reacted with the reactive phosphorus-containing compound. Such additional epoxide-containing compounds may be reacted before, after or simultaneously with the previously mentioned alkyl glycidyl ethers.

A further option according to the invention is to react a hydroxyl-containing compound with the above formed reaction product of the phosphorus-containing reactant and a stoichiometrically insufficient amount of the epoxy compounds. Because of the previously described inability to mix epoxy- and hydroxyl-containing reactants, the above hydroxyl-containing compounds are reacted either before or after the reaction of the epoxy-containing compounds.

Suitable alkyl glycidyl ethers are compounds of the formula

where R' and m are as previously defined; and Q is an alkyl moiety such as tertiary butyl or tertiary amyl that may be easily removed under acid conditions to produce a hydroxyl moiety. Preferably Q is tertiary butyl and a preferred alkyl glycidyl ether is tertiary butyl glycidyl ether (TBGE).

DETAILED DESCRIPTION OF THE INVENTION

The compounds of the instant invention are esters of phosphorus-containing acids wherein at least one ester moiety of the formula $-OCH_2CHXCH_2R'_mOQ$ is present. Specifically, the compounds are useful esters formed by reaction of halogenated derivatives of phosphorus compounds with epoxide compounds or mixtures thereof. More particularly, at least some amount of TBGE or other glycidyl ether capable of producing dealkylatable reaction products (hereinafter a dealkylatable glycidyl ether) is employed as the epoxide-containing compound. Both the resulting ester containing at least one terminal t-butyl or other removable alkyl group and the resulting derivative containing at least one terminal hydroxyl group producing using known dealkylation techniques are claimed in the instant invention.

Any amount of dealkylatable glycidyl ether may be employed so that some of the desired ester moiety is produced in the reaction product. For this reason, even though individual molecules of the invented compound possess an integer number of the specified ester moiety, when viewed in the aggregate, fractional equivalent amounts of the specified ester moiety may be present in the invented compounds.

Because reactive hydroxyl moieties are not present during the ester-forming stages of the reaction, no contamination by other reaction products occurs. For this reason, the desired ester compound is produced in very high purity. For example, the lower molecular weight compounds have been found to be light bodied oils and not highly viscous materials as previously reported. Preferred are such compunds having a viscosity (as measured directly by a Brookfield viscosity meter) of less than 500,000 centipoise (cps), and most preferably less than 100,000 cps. Viscosity measure is considered an accurate indication of the purity of the named compounds, inasmuch as by-products are oligomeric and accurate structural analysis of the products is generally difficult, if not impossible.

The reaction of halogenated phosphorus-containing compounds with epoxy groups is a well-known reaction. The reaction of epoxides with phosphoryl halides has been previously disclosed in U.S. Pat. No. 2,610,978. The more active compounds readily react without the presence of a catalyst, the two compounds need only to be brought into contact at a suitable temperature. Thus, for example, one mole of t-butyl glycidyl ether will react with $PCl_5$ without the presence of a catalyst upon heating of a mixture of the two reactants.

However, less reactive halogenated phosphorus compounds will react with t-buty glycidyl ether only in the presence of a catalyst. For example, two additional moles of t-butyl glycidyl ether will react with the above product of $PCl_5$ in the presence of a catalyst. However, complete reaction of all five halogen moieties has not been observed.

In a similar manner the other phosphorus compounds of the invention may also be prepared.

Suitable phosphorus-containing reactants include the following: phosphorus trihalide, phosphoryl halide, phosphorus pentahalide, and partial reaction products thereof, e.g., the above compounds having one or two halogen moieties replaced by alkyl, aryl, haloalkyl, haloaryl, alkoxy, alkoxyalkyl, aryloxyalkyl, haloalkoxy, or haloalkoxyalkyl moieties. Alternatively, haloalkoxy moieties, for example, may be added to the desired compound by reaction of an epoxy or halogenated epoxy compound in combination with the t-butyl glycidyl ether compound. Moreover, it is possible to react mono- or polyhydroxyl-containing compounds with the phosphorus-containing compound as is already known. This is performed by means of a second reaction before or after the reaction with t-butyl glycidyl ether. In this manner, additional alkoxy or hydroxyalkoxy-containing substituents may be introduced into the compound.

Suitable catalysts for the reaction of epoxy compounds with halogenated phosphorus compounds in the present invention are those catalysts previously known in the art. Included are halogenated titanium or zirconium compounds. A preferred catalyst is $TiCl_4$.

The epoxy-containing compound optionally reacted with the halogenated phosphorus compound is preferably one which does not contain hydroxyl-functionality in order to avoid undesired reaction of the halogen and hydroxyl moieties as previously explained. Suitable epoxy compounds include the well-known alkylene oxides as well as halogenated derivatives thereof and glycidyl ethers other than t-butyl glycidyl ether. Specific examples include:
ethylene oxide
propylene oxide
epihalohydrin
trihalobutylene oxide styrene oxide
1,2-epoxy-3-phenoxypropane
1,2-epoxy-3-isopropoxypropane
1,2-epoxy-3-halophenoxypropane
etc.

The reaction of the TBGE or other glycidyl ether capable of producing dealkylatable reaction products with the previously described phosphorus compounds is illustrated schematically as follows.

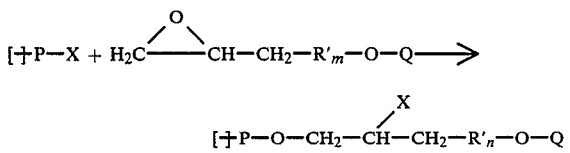

where: [}— represents the remaining portion of the phosphorus-containing reactant.

The dealkylation procedure is accomplished by known techniques. One method is to merely contact the compound to be dealkylated with an acid or acid ion-exchange resin optionally at elevated temperatures. Suitable acids include p-toluene sulfonic acid and phosphoric acid. The reaction liberates the coresponding alkene, e.g., isobutene when TBGE was the glycidyl ether employed in the ester-forming reaction.

It is understood that solvents may be employed if desired during the reaction process for both the esterification and the dealkylation reaction.

It is further to be understood that while individual molecules of the reaction product contain exactly one, two or three of the characterizing ester moieties this is not necessarily true in the aggregate. That is, one mole of the finished product may contain any amount including fractional amounts up to three equivalents of the ester functionality. For this reason, n of the specified formula may be any number greater than or equal to zero and less than three.

The product is a hydroxyl-containing compound which may be readily reacted with diisocyanate compounds alone or in combination with other reactants used in the fabrication of polyurethane polymers. Depending on the degree of dealkylation there may be only hydroxy terminated ester moieties, or the selected compound may comprise one or more ester moieties terminated by dealkylatable alkyl moieties as well. Persons of ordinary skill in the art are well able to devise suitable formulations for producing polyurethanes according to this invention. As long as there is at least one terminal hydroxyl substituent, the compound will incorporate in the polyurethane as a reactant. Descriptions of the various reactants for such formulations are found in the following publications, the teachings of which are incorporated herein by reference: *Kirk-Othmer Encyclopedia of Chemical Technology*, "Foamed Plastics", Vol. 9, pp. 853–854 (1966) and Saunders et al., *Polyurethanes, Chemistry and Technology*, Vols. I and II, Interscience Publishers 1963.

The preferred polyurethane product employing the instant compound as a reactant is a foam. It is understood that additional components such as amounts of other chemical compounds designed to render the product less adversely affected by fire may be included in the polymer formulation. These additional components are well-known to the art. Examples include: tris(dibromopropyl)phosphate, tris(2-chloroethyl)phosphate, dimethyl methyl phosphonate, antimony trioxide, ammonium phosphate, phosphorus- and/or halogen-containing hydroxyl compounds, etc.

Another preferred polyurethane product employs the compound wherein all ester moieties are terminated by Q as dealkylatable alkyl moieties. In this embodiment the inventive compounds comprise ignition resistant additives in the polyurethane.

It is recognized, however, that all known organic polymers will burn when subjected to a sufficiently intense heat source. Thus, terms such as "flame retardant" and "flame spread rating", etc. are not intended to indicate performance under actual fire conditions.

Examples of polyurethane foams according to the instant invention are included herein in Example 46.

SPECIFIC EMBODIMENTS

Having described the invention, the following examples are provided as illustrative and are not to be construed as limiting.

EXAMPLE 1—PHOSPHOROUS ACID: O,O,O-TRIS(2-CHLORO-3-HYDROXY-PROPYL)ESTER

Into a one-liter three-necked glass flask equipped with a reflux condenser, mechanical stirrer and dropping funnel were placed 46 g of phosphorus trichloride (0.33 mole) and 200 ml of toluene. The mixture was stirred and chilled in a cold water bath while 130 g of TBGE (1.0 mole) was slowly added over a period of one hour. An exothermic reaction resulted. After addition of TBGE ceased the mixture was stirred for an additional hour at 25° C.

The flask was then equipped with a short distillation column and low boiling components were removed under partial pressure at 80° C. A light-colored, easily flowable oil remained identified as O,O,O-tris(2-chloro-1-(1,1-dimethylethoxy)propyl)phosphite ⁓ by nuclear magnetic resonance spectroscopy.

A small amount of p-toluene sulfonic acid hydrate (3 g) was added and the mixture heated to 140° C.–155° C. Some low boiling components of the mixture distilled off during the dealkylation reaction. After cooling 100 ml of toluene and 100 ml of methylene chloride were added with stirring. Sodium carbonate (4 g) was added to neutralize the catalyst and the mixture was filtered. Heating under reduced pressure to volatilize solvent gave 82 g (70 percent yield) of an amber-colored oil. Viscosity at 25° C. as measured directly by a Brookfield viscosity meter was 14,200 centipoise (cps).

EXAMPLE 2—PHOSPHOROUS ACID: O-(2-CHLOROETHYL)-O,O-DI(2-CHLORO-3-HYDROXYPROPYL)ESTER

The reaction conditions of Example 1 were substantially repeated. In a reaction vessel 138 g (1 mole) of PCl$_3$ were combined with 400 ml of methylene chloride solvent and 260 g (2.0 moles) of TBGE were added after cooling to about 25° C. After complete addition of TBGE, the mixture was stirred an additional hour. The reaction vessel was warmed slightly in a water bath to approximately 40° C. An excess of ethylene oxide (1.0+ mole) was then added dropwise and the mixture stirred an additional three hours. Removal of solvent under reduced pressure at 80° C. gave 385 g of a light-colored oil identified by NMR spectroscopy as phosphorous acid: O-(2-chloroethyl)-O,O-di(2-chloro-3-(1,1-dimethylethoxy)propyl)ester.

This ester (250 g) was dealkylated by adding 5 g of 85 percent phosphoric acid to the neat compound and heating at 130° C. until the NMR spectra indicated dealkylation was complete. Upon cooling, a light amber-colored oil remained, having a viscosity measured as previously described of 900 cps at 25° C.

EXAMPLES 3–9

The reaction conditions of previous Examples 1 and 2 were substantially repeated employing phosphorus trichloride, TBGE and additional epoxide compounds. The reaction conditions, products and their properties are indicated in the following Table I.

TABLE I

| | Equivalent ratio of epoxy Compound[1] | | Method of Addition | Dealkylation Conditions max. Temp (°C.) | Catalyst | Product[2] | Viscosity (cps)[3] | Yield (%) |
|---|---|---|---|---|---|---|---|---|
| Ex. | TBGE | Other | | | | | | |
| 3 | 2 | 1(EO)[4] | After TBGE addition | 130 | p-TSA[5] | P(HCP)$_2$OCH$_2$CH$_2$Cl) | 900 | 85 |
| 4 | 2 | 1(EO) | " | 135 | MSC-1[6] | P(HCP)$_2$(OCH$_2$CH$_2$Cl) | 2000 | 82 |
| 5 | 1 | 2(EO) | " | 140 | p-TSA | P(HCP)(OCH$_2$CH$_2$Cl)$_2$ | 180 | 89 |
| 6 | 2 | 1(EC)[7] | mixture w/TBGE | 135 | H$_3$PO$_4$ | P(HCP)$_2$(OCH$_2$CHClCH$_2$Cl) | 900 | 80 |
| 7 | 1 | 2(EC) | " | 140 | H$_3$PO$_4$ | P(HCP)(OCH$_2$CHClCH$_2$Cl)$_2$ | 240 | 85 |
| 8 | 1.5 | 1.5(EC) | " | 150 | H$_3$PO$_4$ | P(HCP)$_{1.5}$(OCH$_2$CHClCH$_2$Cl)$_{1.5}$ | 400 | 92 |
| 9 | 2 | 1(PO)[8] | After TBGE addition | 150 | p-TSA | P(HCP)$_2$(OCH$_2$CHClCH$_3$) | 17120 | 77 |

[1]The equivalent ratio of epoxy reactant to phosphorus reactant.
[2]Product was identified by nuclear magnetic resonance spectroscopy. HCP refers to a 3-hydroxy-2-chloropropoxy moiety.
[3]Viscosity as measured by Brookfield viscosity meter at 25° C. in centipoise.
[4]Ethylene oxide.
[5]para-toluene sulfonic acid.
[6]DOWEX ® MSC-1-H$^+$ sulfonated styrene/divinylbenzene macroporous ion-exchange resin in the acid form.
[7]Epichlorohydrin.
[8]Propylene oxide.

EXAMPLE 10—PHOSPHORUS ACID: PHENYL-, O-(2-CHLORO-3-HYDROXYPROPYL)-O-(2,3-DICHLOROPROPYL)ESTER

The reaction conditions of the previous examples were substantially repeated. The phosphorus-containing reactant was phenyl phosphonous dichloride, C$_6$H$_5$-PCl$_2$ (150 g, 0.84 mole), in 300 ml of methylene chloride. The expoxide-containing reactant was a mixture of TBGE (109 g, 0.84 mole) and epichlorohydrin (78 g, 0.84 mole). Dealkylation was accomplished with 4 g of 85 percent phosphoric acid at a dealkylation temperature of between 80° C. and 145° C. The resulting product had a viscosity of 14,200 cps at 25° C. Yield: 261 g, 78 percent.

EXAMPLES 11–13

The reaction conditions of Example 10 were substantially repeated. The solvent employed was methylene chloride. Product identity was determined by nuclear magnetic resonance spectroscopy. Reactants, products and product properties are contained in Table II.

TABLE II

| Ex. | Phosphorus Reactant | Equivalent ratio of epoxy Compound | | Method of Addition | Dealkylation Conditions max. Temp (°C.) | Catalyst | Product | Viscosity (cps)[2] | Yield (%) |
|---|---|---|---|---|---|---|---|---|---|
| | | TBGE | Other | | | | | | |
| 11 | C$_6$H$_5$PCl$_2$ | 2 | — | — | 125 | p-TSA[3] | C$_6$H$_5$P(HCP)$_2$[4] | 109,000 | 98 |
| 12 | PBr$_3$ | 3 | — | — | 120 | p-TSA[3] | P(HBP)$_3$[5] | >500,000[6] | 42 |
| 13 | PBr$_3$ | 1 | 2(EO)[7] | After TBGE addition | 135 | H$_3$PO$_4$ | P(HBP)(OCH$_2$CH$_2$Br)$_2$ | 3,600 | 78 |

[1]The equivalent ratio of epoxy reactant to phosphorus reactant.
[2]Viscosity as measured by a Brookfield viscosity meter in centipoise at 25° C.
[3]para-toluene sulfonic acid.
[4]HCP refers to a 3-hydroxy-2-chloropropoxy moiety.
[5]HBP refers to a 3-hydroxy-2-bromopropoxy moiety.
[6]The viscosity was too large to measure.
[7]Ethylene oxide.

EXAMPLE 14—PHOSPHOROUS ACID: O,O-DI(2-CHLORO-3-HYDROXY-PROPYL)-O-(2-CHLOROETHYL)ESTER DICHLORIDE

The reaction conditions of the previous examples were substantially repeated. The phosphorus-containing reactant was phosphorus pentachloride (105 g, 0.5 mole) present in 500 ml of methylene chloride. The mixture was stirred while TBGE (130 g, 1.0 mole) was added dropwise. An exotherm was observed but TiCl$_4$ (1.0 g) catalyst had to be added to continue the reaction. After complete addition of TBGE, the mixture was stirred an additional hour. Next ethylene oxide (30 g, 0.5+ mole) was added dropwise at reflux temperatures. The mixture was stirred until analysis indicated that reaction was complete.

The solvent and unreacted excess ethylene oxide were removed by distillation. A portion of the product (130 g) was then heated to about 100° C. in a reactor equipped with a distillation column in the presence of 85 percent phosphoric acid (3 g). Samples were extracted and analyzed by nuclear magnetic resonance spectroscopy until analysis indicated that dealkylation was completed. The product was a light amber-colored oil having a viscosity of 3,000 cps at 25° C. Yield was 90 percent overall.

EXAMPLE 15—PHOSPHORIC ACID: O-(2-CHLORO-3-HYDROXYPROPYL)-O,O-DI(2-CHLOROPROPYL)ESTER

The reaction conditions of the previous examples were substantially repeated employing phosphoryl chloride as the phosphorus-containing reactant. Accordingly, to a one-liter three-necked glass flask equipped with a reflux condenser and dropping funnel were added phosphoryl chloride (154 g, 1.0 mole), $TiCl_4$ (0.5 g) and methylene chloride (300 ml). While stirring, a mixture of TBGE (130 g, 1.0 mole) and propylene oxide (2.0 moles) was slowly added so as to maintain a gentle reflux (40° C.-58° C.). Upon complete addition, the mixture was heated at reflux for an additional 2 hours then cooled. Solvent was removed by distillation and 85 percent phosphoric acid (5 g) added. The mixture was heated to 130° C. while continuing to remove volatile products via the distillation column. After dealkylation was complete, a dark amber-colored oil remained having a viscosity of 2,600 cps at 25° C. Analysis by nuclear magnetic resonance spectroscopy confirmed the products' identity. Yield was 90 percent.

EXAMPLE 16-27

The reaction conditions of Example 15 were substantially repeated. Phosphoryl chloride was the phosphorus-containing reactant, $TiCl_4$ the catalyst, and methylene chloride the solvent. The epoxy reactants, products formed and product properties are contained in Table III.

TABLE III

| Ex. | Equivalent ratio of epoxy Compound[1] TBGE | Other | Method of Addition | Dealkylation Conditions max. Temp (°C.) | Catalyst | Product[2] | Viscosity (cps)[3] | Yield (%) |
|---|---|---|---|---|---|---|---|---|
| 16 | 1 | 2(EC)[4] | Mixture w/TBGE | 130 | $H_3PO_4$ | $(HCP)\overset{O}{\overset{\|}{P}}OCH_2CHClCH_2Cl$[5] <br> $\|$ <br> $OCH_2CHClCH_2Cl$ | 52,000 | 90 |
| 17 | 1 | 1(EC) <br> 1(PO)[6] | Mixture w/TBGE <br> After TBGE/EC addition | 150 | $H_3PO_4$ | $(HCP)\overset{O}{\overset{\|}{P}}OCH_2CHClCH_2Cl$ <br> $\|$ <br> $OCH_2CHClCH_3$ | 38,500 | 86 |
| 18 | 1 | 1(EC) <br> 1(EO)[7] | Mixture w/TBGE <br> After TBGE/EC addition | 130 | $H_3PO_4$ | $(HCP)\overset{O}{\overset{\|}{P}}OCH_2CHClCH_2Cl$ <br> $\|$ <br> $OCH_2CH_2Cl$ | 4,800 | 95 |
| 19 | 2 | 1(EO) | After TBGE addition | 125 | $H_3PO_4$ | $\overset{O}{\overset{\|}{P}}(HCP)_2(OCH_2CH_2Cl)$ | 40,000[8] | 85 |
| 20 | 2 | 1(EO) | After TBGE addition | 125 | $H_3PO_4$ | $\overset{O}{\overset{\|}{P}}(HCP)_2(OCH_2CH_2Cl)$ | 72,000 | 85 |
| 21 | 1 | 21(EO) | After TBGE addition | 130 | $H_3PO_4$ | $\overset{O}{\overset{\|}{P}}(HCP)(OCH_2CH_2Cl)_2$ | 850 | 98 |
| 22 | 1.5 | 1.5(EO) | After TBGE addition | 125 | $H_3PO_4$ | $\overset{O}{\overset{\|}{P}}(HCP)_{1.5}(OCH_2CH_2Cl)_{1.5}$ | 17,250 | 95 |
| 23 | 2 | 1(EB)[9] | Mixture w/TBGE | 150 | $H_3PO_4$ | $\overset{O}{\overset{\|}{P}}(HCP)_2(OCH_2CHClCH_2Br)$ | >500,000[10] | 81 |
| 24 | 1 | 1(EB) <br> 1(EO) | Mixture w/TBGE <br> After TBGE/EB addition | 150 | $P_2O_5$ | $(HCP)\overset{O}{\overset{\|}{P}}OCH_2CHClCH_2Br$ <br> $\|$ <br> $OCH_2CH_2Cl$ | 8,500 | 98 |
| 25 | 1 | 1(TCMP)[11] <br> 1(PO) | Mixture w/TBGE <br> After TBGE/TCMP addition | 150 | $H_3PO_4$ | $(HCP)\overset{O}{\overset{\|}{P}}OCH_2CHClCH_2CCl_3$ <br> $\|$ <br> $OCH_2CHClCH_3$ | 18,750 | 91 |
| 26 | 1.5 | 1.5(EC) | Mixture w/TBGE | 135 | $H_3PO_4$ | $\overset{O}{\overset{\|}{P}}(HCP)_{1.5}$ <br> $\|$ <br> $(OCH_2CHClCH_2Cl)_{1.5}$ | 17,250 | 95 |

TABLE III-continued

| Ex. | Equivalent ratio of epoxy Compound[1] TBGE | Equivalent ratio of epoxy Compound[1] Other | Method of Addition | Dealkylation Conditions max. Temp (°C.) | Catalyst | Product[2] | Viscosity (cps)[3] | Yield (%) |
|---|---|---|---|---|---|---|---|---|
| 27 | 1 | 1(TBPG)[12] 1(EC) | Mixture w/TBGE After TBGE/TBPG addition | 125 | $H_3PO_4$ | (HCP)$\overset{O}{\overset{\|}{P}}$OCH$_2$CHClCH$_2$Cl $\|$ OCH$_2$CHClCH$_2$OCHCH$_2$OH $\|$ CH$_3$ | 11,100 | 97 |

FOOTNOTES FOR TABLE III
[1] The equivalent ratio of epoxy reactant to phosphorus reactant.
[2] Product was identified by nuclear magnetic resonance spectroscopy.
[3] Viscosity as measured by Brookfield viscosity meter at 25° C. in centipoise.
[4] Epichlorohydrin.
[5] HCP refers to the 3-hydroxy-2-chloropropoxy moiety.
[6] Propylene oxide.
[7] Ethylene oxide.
[8] Propylene oxide added after dealkylation to neutralize residual phosphoric acid catalyst.
[9] Epibromohydrin.
[10] Viscosity was too large to measure.
[11] 3-trichloromethylpropylene oxide.
[12] Tertiary butoxy propyl glycidyl ether

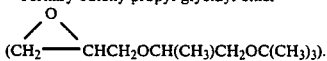

$(CH_2\text{———}CHCH_2OCH(CH_3)CH_2OC(CH_3)_3)$.

EXAMPLE 28

The reaction conditions of Example 15 were substantially repeated. The phosphorus-containing reactant was phosphoryl bromide, P(O)Br$_3$ (144 g, 0.5 mole), which was added to a one-liter glass flask containing 500 ml of methylene chloride and about 1 g of TiCl$_4$. The above was stirred while cooling in a cold water bath during the dropwise addition of ethylene oxide (22 g, 0.5 mole). An exothermic reaction was observed. An additional gram of TiCl$_4$ was added and then TBGE (130 g, 1.0 mole) was added dropwise. The mixture was then refluxed for 2 hours and finally another portion of ethylene oxide (10 g) was added to ensure complete esterification. After cooling, the mixture was washed with dilute aqueous NaOH, the product layer was separated, dried over sodium sulfate, filtered and the solvent removed by distillation at reduced pressure.

Dealkylation was performed using p-toluene sulfonic acid (3 g) at 120° C. unitl NMR analysis indicated complete dealkylation. The product was a dark oil, having a viscosity at 20° C. of 800 cps. Yield was 75 percent.

EXAMPLES 29–37

The reaction conditions of Example 28 were substantially repeated employing additional phosphorus-containing reactants. The epoxy reactants, reaction conditions and product properties are contained in Table IV. The solvent employed was methylene chloride. the esterification catalyst was TiCl$_4$. Dealkylation was accomplished by heating to about 130° C. in the presence of a small amount of H$_3$PO$_4$ except for Examples 30 and 31 wherein p-toluene sulfonic acid was employed.

TABLE IV

| | Phosphorous Reactant | Equivalent ratio of epoxy Compound[1] TBGE | Equivalent ratio of epoxy Compound[1] Other | Method of Addition | Product | Viscosity (cps)[2] | Yield (%) |
|---|---|---|---|---|---|---|---|
| Ex. | | | | | | | |
| 29 | P(O)Br$_3$ | 1 | 2(EO)[3] | After TBGE addition | $\overset{O}{\overset{\|}{P}}$(HBP)(OCH$_2$CH$_2$Br)$_2$ | 11,000 | 86 |
| 30 | P(O)Br$_3$ | 2 | 1(EO) | After TBGE addition | $\overset{O}{\overset{\|}{P}}$(HBP)$_2$(OCH$_2$CH$_2$Br) | 15,250 | 98 |
| 31 | (CH$_3$CH$_2$O)$_2$P(O)Br | 1 | — | — | $(CH_3CH_2O)_2\overset{O}{\overset{\|}{P}}(HBP)$ | 4,000 | 85 |
| 32 | ClCH$_2$P(O)Cl$_2$ | 1 | 1(EC)[4] | Mixture w/TBGE | ClCH$_2$$\overset{O}{\overset{\|}{P}}$(HCP)(OCH$_2$CHClCH$_2$Cl) | 11,200 | 99 |
| 33 | C$_6$H$_5$P(O)Cl$_2$ | 1 | 1(TE)[5] | After TBGE addition | C$_6$H$_5$$\overset{O}{\overset{\|}{P}}$(HCP)(OCH$_2$CHClCH$_2$CCl$_3$) | 56,000 | 98 |
| Run | | | | | | | |
| 34 | ClCH$_2$P(O)Cl$_2$ | 1 | 1(EB)[6] | After TBGE addition | ClCH$_2$$\overset{O}{\overset{\|}{P}}$(HCP)(OCH$_2$CHClCH$_2$Br) | 15,500 | 95 |
| 35 | C$_6$H$_5$P(O)Cl$_2$ | 2 | — | — | C$_6$H$_5$P(O)(HCP)$_2$ | 203,000 | 98 |

TABLE IV-continued

| | Phosphorous Reactant | Equivalent ratio of epoxy Compound[1] | | Method of Addition | Product | Viscosity (cps)[2] | Yield (%) |
|---|---|---|---|---|---|---|---|
| | | TBGE | Other | | | | |
| 36 | $ClCH_2P(O)Cl_2$ | 1 | 1(SO)[7] | Mixture w/TBGE | $ClCH_2P(HCP)(OCH_2CHClC_6H_5)$ with =O | 82,500 | 95 |
| 37 | $ClCH_2P(O)Cl_2$ | 1 | 1(EO) | After TBGE addition | $ClCH_2P(O)(HCP)OCH_2CH_2Cl$ | 3,600 | 98 |

[1]The equivalent ratio of epoxy reactant to phosphorus reactant.
[2]Viscosity as measured by Brookfield viscosity meter at 25° C. in centipoise.
[3]Ethylene oxide.
[4]Epichlorohydrin.
[5]Trichloromethylpropyl-1,2-epoxide.
[6]Epibromohydrin.
[7]Styrene oxide.

EXAMPLE 38—PHOSPHORIC ACID: O-(2-CHLOROETHYL)-O,O-DI(2-CHLORO-3-HYDROXYPROPYL)ESTER

The initial reaction conditions of the previous examples were substantially repeated. The phosphorus-containing reactant was phosphorus trichloride (148 g, 1.0 mole). This was combined in a two-liter glass flask with 500 ml of methylene chloride. TBGE (390 g, 3.0 moles) was added dropwise and after complete addition the mixture was refluxed for 4 hours.

Instead of dealkylating the resulting product, however, chlorine (71 g) was bubbled through the reaction mixture. After complete addition, the mixture was stirred for 30 minutes. A sample was extracted and found to contain primarily phosphoric acid: O,O-di(2-chloro-3-(1,1-dimethylethoxy)propyl phosphorate chloride, $ClP(O)(OCH_2CHClCH_2OC(CH_3)_3)$. The by-product 2,3-dichloropropyl tertiary butyl ether was removed by distillation.

This product was then further reacted with ethylene oxide (50 g, 1.0+ mole) in the presence of $TiCl_4$ catalyst. The mixture was refluxed for 1 hour, cooled, washed with dilute, aqueous NaOH and the product, phosphoric acid: O,O-di(2-chloro-3-1,1-dimethylethoxy)-propyl ester, was recovered.

Dealkylation was accomplished by the normal procedure using DOWEX® MSC-1-H+ ion-exchange resin. (DOWEX is a trademark of The Dow Chemical Company.)

EXAMPLE 39—PHOSPHORIC ACID: O-(2-BROMOETHYL)-O,O-DI-(2-CHLORO-3-HYDROXYPROPYL)ESTER

The reaction procedure of Example 38 was substantially repeated expecting the initial reaction product, $P[OCH_2CHClCH_2OC(CH_3)_3]_3$, was brominated instead of chlorinated. Reaction with ethylene oxide according to the above procedure and dealkylation gave 92 percent yield of phosphoric acid: O-(2-bromoethyl)-O,O-di(2-chloro-3-hydroxypropyl)ester. The product was a dark amber oil having a viscosity at 25° C. of 1,675 cps as measured by a Brookfield viscosity meter.

EXAMPLE 40—PHOSPHORIC ACID: O-(2-BROMO-3-HYDROXYPROPYL)-O,O-DI(2-CHLOROETHYL)ESTER

The reaction conditions of Examples 38 and 39 were substantially repeated excepting that phosphorus trichloride was initially reacted with 3 equivalents of ethylene oxide and then reacted with bromine. The resulting product, phosphoric acid: O,O-di(2-chloroethyl)-phosphate bromide was reacted with 1 equivalent of TBGE in methylene chloride solvent using $TiCl_4$ catalyst. After dealkylation with p-toluene sulfonic acid a dark amber-colored oil remained having a viscosity of 20,750 cps at 25° C. and identified as phosphoric acid: O,O-di(2-chloroethyl)-O-(2-bromo-3-hydroxypropyl)ester. Yield was 85 percent.

EXAMPLE 41—PHOSPHORIC ACID: O-(2-BROMOETHYL)-O-(2-BROMO-3-HYDROXYPROPYL)-O-(2-CHLORO-3-HYDROXYPROPYL)ESTER

Phosphorus trichloride (70 g, 0.5 mole) was combined in 300 ml of methylene chloride in a glass reactor and cooled in a cold water bath. Ethylene glycol (31 g, 0.5 mole) was added dropwise under a nitrogen blanket. The mixture was warmed to room temperature and bromine (80 g, 0.5 mole) was added dropwise. An exothermic reaction resulted. After bromine color in the solution disappeared indicating the reaction was complete, a catalyst, $TiCl_4$ (1 g), was added. TBGE (130 g, 1.0 mole) was then added dropwise with stirring. The mixture was refluxed until analysis indicated reaction was complete. Solvent was then removed and the mixture heated to about 130° C. Dealkylation occurred without the presence of a catalyst giving 81 percent yield of a thick oil.

The path of the reaction is illustrated by the following schematic illustration.

The identities of intermediates and final reaction products were determined by nuclear magnetic resonance spectroscopy.

EXAMPLE 42—PHOSPHORIC ACID: O-2-BROMO-3-HYDROXYPROPYL)-O-(2-CHLORO-3-HYDROXYPROPYL)-O-(2,3,4-TRI-BROMOBUTYL)ESTER

The reaction conditions of Example 41 were essentially repeated. Accordingly, phosphorus

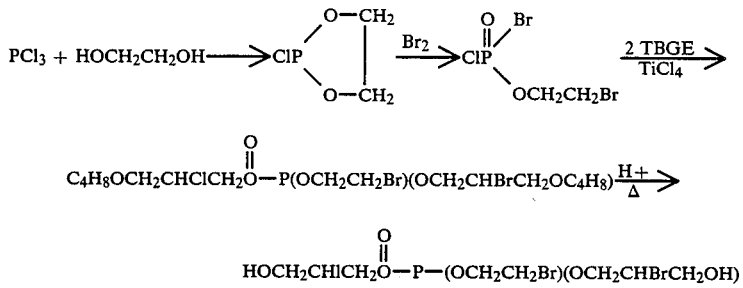

trichloride (46 g, 0.33 mole) was combined in 400 ml of carbon tetrachloride in a one-liter flask. The mixture was stirred and cooled in an ice water bath while 1,4-butene-diol (30 g, 0.33 mole) was added dropwise. After complete addition of the diol, the reaction vessel was warmed to room temperature while being stirred. After 1 hour, bromine (107 g, 0.67 mole) was added dropwise causing an exothermic reaction. The mixture was heated to 40° C. for 2 hours and 2 g of $TiCl_4$ along with 200 ml of methylene chloride were added. Then TBGE (88 g, 0.67 mole) was added dropwise. The mixture was refluxed for 1 hour then volatile bodies were removed by heating under partial pressure. Phosphoric acid dealkylation catalyst (85 percent) was added and heating at 100° C. was continued to dealkylate the product. The product was recovered as a thick oil and identified as the desired product by NMR spectroscopy. Yield was 99 percent.

In view of the products' identity, the course of the reaction may be indicated schematically as:

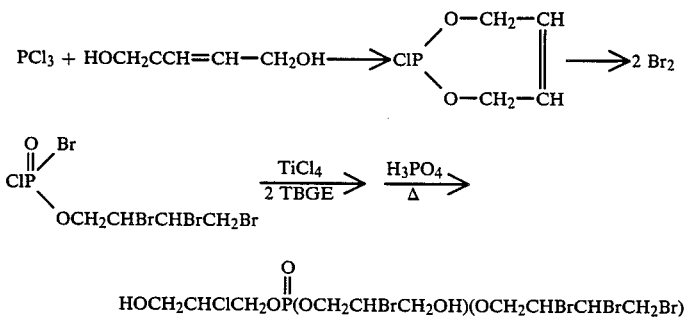

EXAMPLE 43—PHOSPHOROUS ACID: O-(2-CHLOROETHYL)-O-O-DI(2-CHLORO-3-HYDROXYPROPYL)ESTER

This ester, previously produced in Example 2, was produced by an alternate route. Accordingly, phosphoryl chloride (154 g, 1.0 mole) was charged to a two-liter glass flask containing 400 ml of methylene chloride and 1 g of $TiCl_4$. TBGE (260 g, 2.0 moles) was added dropwise at reflux temperature with stirring. The reaction mixture was stirred until the reaction was complete as indicated by lack of epoxy moieties. Then 2-chloroethanol (160 g, 2.0 moles) was added dropwise and the resulting mixture stirred for 3 hours at reflux. The flask was equipped with a distillation column and solvent was removed. Heating was continued to 125° C. under reduced pressure until analysis by nuclear magnetic resonance spectroscopy indicated dealkylation was complete. Yield was 86 percent of a viscous oil having a viscosity of 517,500 cps at 25° C.

EXAMPLE 44—PHOSPHORIC ACID: O,O-DI(2-CHLORO-3-HYDROXYPROPYL)ESTER

The reaction conditions of Example 43 were substantially repeated except that the phosphorus reactant was phosphoryl trichloride ($P(O)Cl_3$) and water was the hydroxyl-containing reactant subsequently reacted with the phosphorus-containing intermediate product. Accordingly, phosphoryl trichloride (52 g, 0.5 mole) was placed in a glass reaction flask along with 300 ml of methylene chloride. TBGE (130 g, 1.0 mole) and $TiCl_4$ (1.0 g) were slowly added. The reaction mixture was stirred while cooling in a water bath until the reaction was complete. Next, $H_2O$ (9.5 g, 0.5 mole) was added dropwise producing a slight temperature rise. After complete addition, the mixture was stirred an additional period of 2 hours at reflux.

Low boiling components were removed by distillation. Dealkylation occurred upon heating to about 130° C. When completed, 132 g of a very heavy oil remained which was identified as phosphoric acid: O,O-di(2-chloro-3-hydroxypropyl)ester.

EXAMPLE 45—PHOSPHONIC ACID: CHLOROMETHYL-O,O-DI(2-CHLORO-3-HYDROXYPROPYL)ESTER

A comparative reaction was prepared in order to duplicate the results disclosed by U.S. Pat. No. 3,939,227. Accordingly, chloromethyl phosphonic acid dichloride, $ClCH_2P(O)Cl_2$ (45.2 g, 0.27 mole) was reacted with glycidol (40 g, 0.54 mole) by adding the phosphorus reactant dropwise to a stirred solution of the glycidol in methylene chloride maintained at 4° C. in an ice bath. The reaction mixture rose to 9° C. After complete addition of phosphorus reactant the mixture was warmed to room temperature and finally stirred for an additional hour at reflux. The solvent was then removed by distillation on a rotary evaporator under reduced pressure. The remaining product was a very thick tar indicating that considerable by-products and oligomers were formed. Viscosity was estimated as greater than 500,000 cps because the material was too viscous to measure the viscosity with a Brookfield viscosity meter.

In contrast, chloromethyl phosphonic acid dichloride (84 g, 0.5 mole) was combined with 300 ml of methylene chloride and 1 g of TiCl₄ in a one-liter flask at room temperature while TBGE (135 g, 1.0+ mole) was added dropwise. An exothermic reaction resulted. After complete addition, the mixture was refluxed for 1 hour and low boiling components were removed by distillation at 80° C. Then phosphoric acid (85 percent, 3 g) was added and the temperature raised to 125° C. to effect dealkylation. When analysis indicated dealkylation was complete, the mixture was cooled producing 155 g of an amber-colored oil, 98 percent yield. The viscosity was 39,000 cps at 25° C. as measured by a Brookfield viscosity meter.

EXAMPLE 46—POLYURETHANE FOAM

Polyurethane foams were produced by reacting organic polyisocyanates and various other components with some of the esters produced according to the above examples. In the various foam formulations, the first polyol employed (polyol 1) was a polypropylene oxide derivative initiated from a mixture of sucrose and glycerine having a hydroxyl number of 490. Polyol 2 was polypropylene oxide derivative initiated from aminoethyl ethanolamine having a hydroxyl number of 800. In all formulations, additional small amounts of a tin catalyst, T-131* (0.2 g), available commercially from M&T Chemical, an amine catalyst Polycat* 8 (1.0 g), available commercially from Abbott Labs, and a silicone surfactant, DC-197 (2.0 g), available from the Dow Corning Corporation, were employed. The diisocyanate reactant was 4,4'-diphenylmethane diisocyanate.

The foams were made by mixing the indicated number of grams of the various reactants more fully described in the following Table V. The resulting mixture was stirred for about 10 seconds, and then poured into a cylindrical container prior to the reaction cream time. The foam was then allowed to cure at ambient temperature.

The properties of some polyurethane foams as well as a comparative foam containing none of the novel ester compound are included in Table V. Vertical burn rates were obtained by igniting a small strip of cured foam (⅞″×3″×¼″) in a vertical position under a 25 percent oxygen atmosphere. The time required for flames to travel two inches was measured and the rate of burn calculated. It is seen that incorporation of the novel esters of the invention into a typical polyurethane foam results in a considerable decrease in the vertical burn rate of the foam.

TABLE V

| Components | Control | Formulation 1 | Formulation 2 | Formulation 3 | Formulation 4 | Control | Formulation 5 |
|---|---|---|---|---|---|---|---|
| Polyol 1 | 80 | 72 | 72 | 72 | 68 | 80 | 72 |
| Polyol 2 | 20 | 18 | 18 | 18 | 17 | 20 | 18 |
| Phosphate ester | — | 10[1] | 10[1] | 10[2] | 15[3] | — | 10[3] |
| DMMP[4] | — | — | 1 | — | — | — | — |
| Freon ® IIB[5] | 57.3 | 57.3 | 57.3 | 47.8 | 47.9 | 47.9 | 48.5 |
| 4,4'-diphenyl methane diisocyanate | 186.7 | 186.7 | 186.7 | 139 | 139.6 | 139 | 143 |
| Isocyanate index | 150 | 150 | 150 | 120 | 120 | 120 | 115 |
| Properties | | | | | | | |
| Cream Time (sec) | — | 12 | 12 | 12 | 17 | — | 11 |
| String Time (sec) | — | 33 | 27 | 29 | 40 | — | 30 |
| Tackfree Time (sec) | — | 50 | 40 | 39 | 63 | — | 40 |
| Density (lb/ft³)(kg/m³) | 1.9(30.4) | 2.0(32) | 2.0(32) | 2.15(34.4) | 1.86(29.8) | 1.9(30.4) | 1.8(28.8) |
| Verticle burn (in/min)(cm/min) | 9.0(22.8) | 6.3(16) | 5.4(13.7) | 6.1(15.5) | 6.4(16.3) | 10.0(25.4) | 6.5(16.5) |

[1]Produced in Example 2.
[2]Produced in Example 5.
[3]Produced in Example 20.
[4]Dimethyl methyl phosphonate fire-retardant additive.
[5]Fluorocarbon foaming agent available commercially from E.I. Du Pont de Memours, Inc.

What is claimed is:

1. A substituted phosphorus-containing compound selected from the group consisting of:

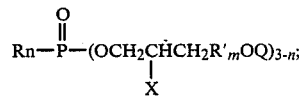

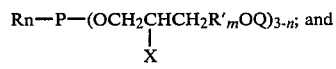

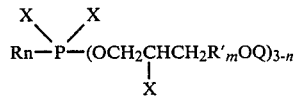

wherein
X is halo-;
R is hydroxyl, halo or a moiety having up to 10 carbons selected from the group consisting of alkyl, aryl, haloalkyl, haloaryl, alkoxy, alkoxyalkyl, aryloxyalkyl, haloalkoxy and haloalkoxyalkyl;
R' is a divalent moiety having up to 10 carbons selected from alkylene, arylene, alkyl- and aryl-substituted derivatives thereof, and $-(OCH_2CHR'')-_x$, where R'' is hydrogen, methyl, ethyl or halomethyl, and x is 1, 2 or 3;
Q is selected from the group consisting of tertiary butyl and tertiary amyl;
m is zero or 1; and
n is a number greater than or equal to zero and less than three that indicates the number of equivalents of specified moiety per mole of named compounds, said compound having a viscosity at 25° C. as measured by a Brookfield viscosity meter at less than 500,000 centipoise.

2. A compound according to claim 1 wherein m is zero and Q is tertiary butyl.

3. compound according to claim 1 wherein m is zero and Q is tertiary amyl.

* * * * *